UNITED STATES PATENT OFFICE.

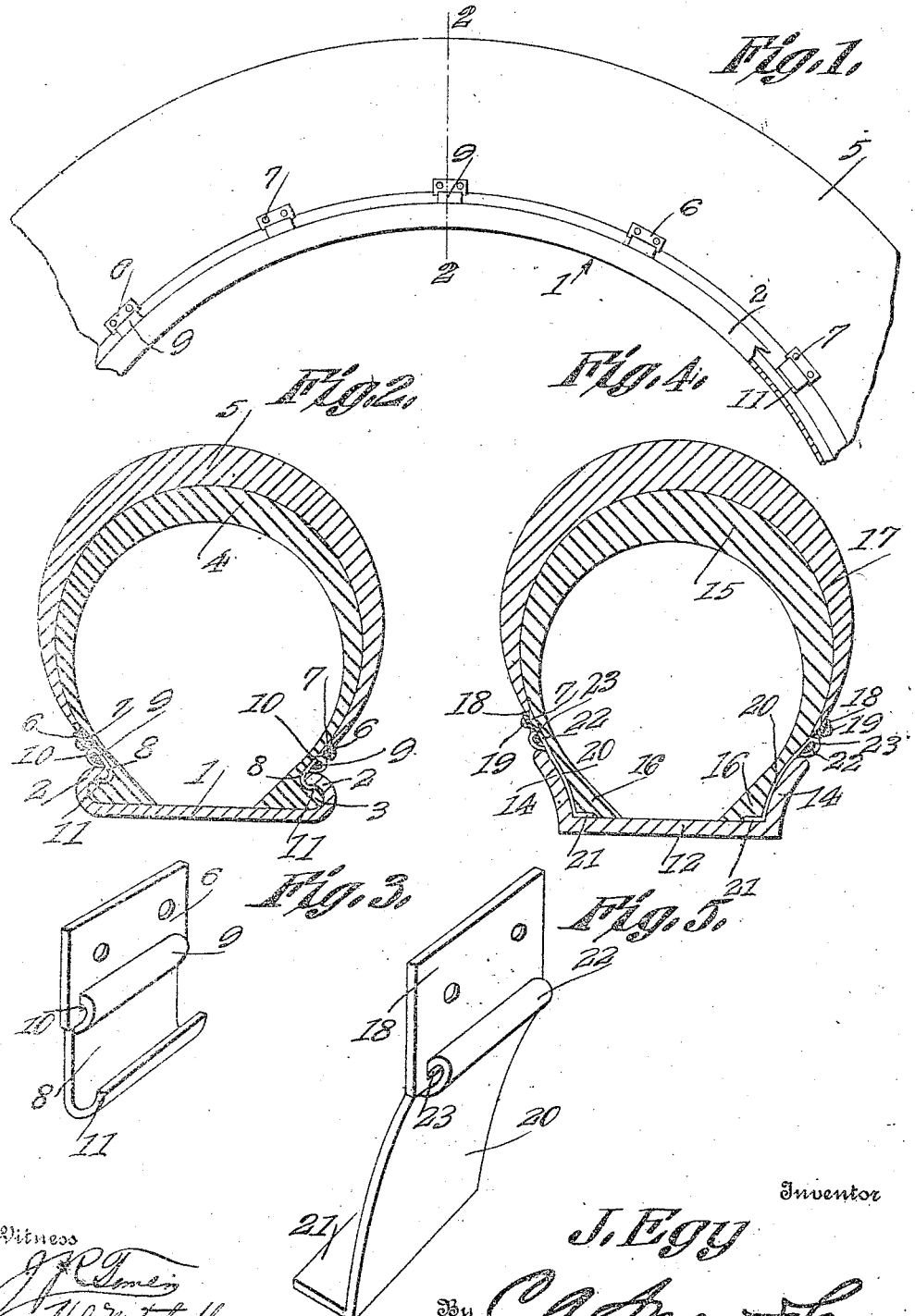

JOHN EGY, OF PARKER, KANSAS.

TIRE.

1,258,204.

Specification of Letters Patent.

Patented Mar. 5, 1918.

Application filed April 26, 1917. Serial No. 164,700.

*To all whom it may concern:*

Be it known that I, JOHN EGY, a citizen of the United States, residing at Parker, in the county of Linn and State of Kansas, have invented a new and useful Tire, of which the following is a specification.

The device forming the subject matter of this application is a casing, adapted to be placed about a tire, and one object of the invention is to provide novel means whereby a tire which is imperfect in its tread portion, may be reinforced by a casing made out of a tire which, although perfect in its tread portion, is rim-cut or otherwise imperfect along its longitudinal edges.

The invention aims to provide novel means for holding the casing in place on the tire and on the rim wherewith the tire is assembled.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a portion of a vehicle rim and a tire, whereunto the device forming the subject matter of this application has been applied;

Fig. 2 is a cross section on the line 2—2 of Fig. 1;

Fig. 3 is a perspective view showing the connecting hook which is used in that form of the invention disclosed in Figs. 1 and 2;

Fig. 4 is a cross section corresponding to Fig. 2; but showing a slightly modified form of the invention; and Fig. 5 is a perspective showing the connecting hook used with that form of the invention delineated in Fig. 4.

In the accompanying drawings, the numeral 1 indicates a rim having clencher flanges 2 coöperating with clencher beads 3 on a tire 4. Extended around the tire 4 is a casing 5. Metal plates 6 are attached by securing elements 7 to the casing 5, at intervals, circumferentially of the casing. The numeral 8 indicates hooks, having eyes 9 passing through openings 10 in the plates 6. The bills of the hooks are shown at 11.

The bills 11 of the hooks 8 are engaged beneath the clencher flanges 2, and the eyes 9 bear upon the outer peripheral portions of the flanges 2, as clearly shown in Fig. 2. In this way, the casing 5 is held in place on the tire 4 with unusual security.

In practice, the casing 5 is fashioned from an old tire shoe which, although being reasonably perfect in its tread portion, is rim-cut or otherwise injured along its longitudinal edges. The beads on such a tire shoe are cut off, the plates 6 are applied, and the tire shoe then becomes the casing 5. By the operation above described, two tire casings which are imperfect at different points, may be combined to form a satisfactory structure well adapted to withstand an extended period of usage.

As shown in Figs. 4 and 5, there appears a rim 12 having side flanges 14, the rim carrying a tire 15 provided with beads 16, the parts 16 and 14, however, not being of the clencher type. The casing appears at 17, and the plates are shown at 18, the same being attached by securing elements 19 to the casing 17. The hooks are denoted by the numeral 20 and are provided with inwardly extended bills 21 prolonged beneath the beads 16. The hooks 20 are connected by eyes 22 with the plates 18, the plates having openings 23 in which the eyes 22 are received. In this form of the invention, as in the form shown in Fig. 2, the eyes 22 bear against the outer peripheral portions of the flanges of the rim.

Having thus described the invention, what is claimed is:—

A device of the class described comprising a rim having flanges, and a tire having beads coacting with the flanges, the flanges and the beads constituting coöperating elements; a casing inclosing the tire; plates assembled with the casing; and hooks including eyes pivoted in the plates, the hooks extending between the flanges and the beads, and comprising bills engaged beneath one of said coöperating elements, the eyes engaging the outer peripheral portions of the flanges.

In testimony that I claim the foregoing as my own, I have hereto affixed my signature in the presence of two witnesses.

JOHN EGY.

Witnesses:
C. B. DAY,
C. LANORE COOK.